United States Patent [19]
Huang et al.

[11] Patent Number: 5,959,063
[45] Date of Patent: *Sep. 28, 1999

[54] POLYCARBONATE POLYBUTENE BLENDS

[75] Inventors: Jianing Huang, Glemont; Kevin Hsingtao Dai, Clifton Park, both of N.Y.

[73] Assignee: General Electric Company, Pittsfield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,083

[22] Filed: May 15, 1997

[51] Int. Cl.$^6$ ..................................................... C08G 64/00
[52] U.S. Cl. ............................................. 528/196; 528/198
[58] Field of Search ..................................... 528/196, 198

[56] References Cited

U.S. PATENT DOCUMENTS

| | | |
|---|---|---|
| 2,957,930 | 10/1960 | Jackson .................................... 526/124 |
| 2,999,835 | 9/1961 | Goldberg ................................. 526/124 |
| 3,038,365 | 6/1962 | Peterson .................................... 528/30 |
| 3,334,154 | 8/1967 | Kim ......................................... 528/196 |
| 3,382,255 | 5/1968 | White ....................................... 528/295 |
| 3,633,985 | 1/1972 | Kramer ................................... 528/196 |
| 3,985,822 | 10/1976 | Watson ................................... 526/124 |
| 4,001,184 | 1/1977 | Scott ....................................... 528/196 |
| 4,131,575 | 12/1978 | Adelmann et al. ..................... 528/196 |
| 4,178,281 | 12/1979 | Horn, Jr. ................................. 528/196 |
| 4,399,251 | 8/1983 | Lee .......................................... 524/481 |
| 4,431,570 | 2/1984 | Johnson .................................. 502/170 |
| 4,431,571 | 2/1984 | Karayannis ............................... 502/51 |
| 4,431,572 | 2/1984 | Karayannis et al. .................... 502/151 |
| 5,177,277 | 1/1993 | Eryman et al. ......................... 585/255 |
| 5,412,132 | 5/1995 | Lucarelli et al. ....................... 556/414 |

Primary Examiner—Terressa Mosley

[57] ABSTRACT

The present invention involves blends of polycarbonate resin with a small amount of an aliphatic $C_4$ to $C_{16}$ polyalpha olefin homopolymer or copolymer or its functionalized derivatives.

12 Claims, No Drawings

POLYCARBONATE POLYBUTENE BLENDS

BACKGROUND OF THE INVENTION

1. Field of the Invention

The present invention relates to a novel processing aid for polycarbonate, and more particularly, relates to blends comprising polycarbonate and an effective amount of aliphatic $C_4$ to $C_{16}$ polyalpha olefin, functionalized aliphatic polyalpha olefin polymer or a hydrogenated polyalpha olefin.

2. Description of the Related Art

Aromatic polycarbonate resins have excellent mechanical strength, impact strength and heat resistance and, therefore, are used as engineering plastics in many fields. Improvement of processability by enhancing flow characteristics via adding processing aid is a typical practice in the development of plastics materials. However, the addition of processing aid, e.g. plasticizer, in polycarbonate often leads to a dramatic reduction of its impact strength. For example, when resorcinol diphosphate (RDP) or tetraxylylhydroquinone diphosphate (TXHQDP) is added to polycarbonate, the flow of polycarbonate is improved. However, the notched Izod impact strength of such a polycarbonate blend is decreased to as low as 1 ft-lb/in from 16 ft-lbs/in even when the loading of RDP or TXHQDP is as low as 4% of the total composition. The search of new solution to improve the flow without sacrificing other physical properties is a constant challenge in the development of polycarbonate blends.

This and other objects hereinafter appearing have been achieved in a general sense in accordance with the present invention through the discovery that by incorporating a small amount of an aliphatic $C_4$ to $C_{16}$ polyalpha olefin, specifically polybutene or an epoxy functionalized polybutene, into polycarbonate, the flow of the polycarbonate is substantially improved while maintaining the impact ductility as determined by Dynatup and Notched Izod tests.

SUMMARY OF THE INVENTION

According to the present invention, there is now provided a polymeric blend comprising:

(A) from 10 to 99.9 percent by weight of polycarbonate; and (B) from 0.1 to 10 percent by weight of an aliphatic $C_4$ to $C_{16}$ polyalpha olefin.

DETAILED DESCRIPTION OF THE INVENTION

The polycarbonate resins usefully employed according to the present invention are those previously known and described in the prior art. In general, the polycarbonate resins can be prepared from one or more multihydric compounds by reacting the multihydric compounds such as a diphenol, with a carbonate precursor such as phosgene, a haloformate or a carbonate ester such as diphenyl or dimethyl carbonate. The preferred diphenol is 2,2-bis (4-hydroxyphenyl) propane (also referred to as bisphenol A). Generally speaking, such polycarbonate polymers may be typified as possessing recurring structural units of the formula: —(—O—A—O—C(=O)—)$_n$, wherein A is a divalent aromatic radical of a dihydric phenol or halogen or alkyl substituted phenol. Preferably, the carbonate polymers used in this invention have an intrinsic viscosity (as measured in methylene chloride at 25° C.) ranging from about 0.30 to about 1.00 dl/g. The dihydric phenols which may be employed to provide such nuclear aromatic compounds, containing as functional groups two hydroxy radicals, each of which is attached directly to a carbon atom of the aromatic nucleus. Typically dihydric phenols include but are not limited to 2,2-bis(4-hydroxyphenyl)propane;
hydroquinone;
resorcinol;
2,2-bis(4-hydroxyphenyl)pentane;
2,4'-(dihydroxyphenyl)methane;
bis-(2-hydroxyphenyl)methane;
bis-(4-hydroxyphenyl)methane;
2,4'-dihydroxynaphthalene;
bis-(4-hydroxyphenyl)sulfone;
bis-(3,5-dimethyl-4-hydroxyphenyl)sulfone;
bis-(3,5-dimethyl-4-hydroxyphenyl)propane;
bis-(3,5-dihalo-4-hydroxyphenyl)propane;
bis-(3,5-dihalo-4-hydroxyphenyl)sulfone;
2,2'-bishydroxyphenylfluorene;
1,1-bis(4-hydroxyphenyl)cyclohexane;
4,4'-dihydroxydiphenylether;
4,4'-dihydroxy-3,3' dihalodiphenylether; and
4,4'-dihydroxy 2,5 dihydroxydiphenylether.

Other dihydric phenols which are also suitable for use in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184.

These aromatic polycarbonates can be also copolymerized with linear or branched aliphatic $C_5$ to $C_{12}$ diols or diacids or polysiloxanes or linear or aromatic polyesters, otherwise know as polyester-carbonates.

The polycarbonate resins can be prepared from these raw materials by any of several known processes such as the known interfacial, solution or melt processes.

In general, one or more polycarbonate can be incorporated into the blend of the present invention in amounts of about 10 to 99.9 weight percent, preferably 20 to 99.5 weight percent, and more preferably 40 to 98.5 weight percent. In cases where two polycarbonate resins are incorporated, the ratio of the first polycarbonate to the second polycarbonate may vary from about 10 to 90 to about 90 to 10 weight percent.

The aliphatic $C_4$ to $C_{16}$ polyalpha olefins contemplated in this invention are prepared by polymerizing one or more aliphatic $C_4$ to $C_{16}$ alpha olefins using catalyst as describe in U.S. Pat. Nos. 2,957,930, 3,985,822, 4,431,570, 4,431,571 and 4,431,572 which are incorporated herein as references. The aliphatic $C_4$ to $C_{16}$ alpha olefin is defined as a class of unsaturated aliphatic hydrocarbons having one or more double bonds, with at least one double bond on the number 1 carbon, using the nomenclature rules by IUPAC (International Union of Pure and Applied Chemistry). For simplicity, the typical monomer described above is referred to herein as alpha olefin and the polymer prepared by polymerization of such monomers is referred to herein as polyalpha olefin polymer.

In general, the hydrocarbon feedstock to produce these polyalpha olefins is usually a mixture of 1-butene, trans-2-butene, cis-2-butene, isobutylene, 2-methyl-1-propene, 1-pentene, 4-methylpentene-1, 1-hexene, 1-octene and 1-nonene. The concentration of the alpha olefins in the blend may vary from 0.1 to 10 weight percent, preferably from 0.2 to 5 weight percent, more preferably from 0.4 to 3 weight percent and most preferably from 0.5 to 2.5 weight percent. Ethylene and propylene feedstocks may also be incorporated as comonomers up to about 20 weight percent with the alpha olefins. For the specific case of preparing polybutene polymer, the feedstock used may contain between about 5% to about 100% by weight of isobutylene. For this specific case, it is preferable to use isobutylene rich butene stream in which 70% or greater are isobutylene.

The polyalpha olefins contemplated in this invention are prepared by polymerizing one or more alpha olefins. They are prepared by polymerizing a mixture of $C_4$ to $C_{16}$ olefins by methods that are well known in the art to obtain a $C_4$ to $C_{16}$ olefin polymer with a number average molecular weight range of from about 100 to about 5,000 g/mol as determined by gel permeation chromatography using narrowly dispersed polystyrene as standards.

Generally speaking, the polymerization reaction is a Friedel-Crafts reaction using a catalyst such as aluminum chloride or boron trifluoride and is disclosed extensively in the patent and technical literature. The hydrocarbon feedstock may be a refinery fraction, a pure monoolefin, or a mixture of monoolefins. Monoolefin feedstock where the olefin contains 3 to 16 carbon atoms is preferred. If a pure olefin is used which is gaseous under ambient conditions, it is necessary either to control the reaction pressure or to dissolve the olefin in a solvent medium, inert under the reaction conditions, in order to maintain the olefin in the liquid phase. In the case of isobutylene, which is typical of monoolefins, the feedstock used in the polymerization process may be pure isobutylene or a mixed $C_4$ to $C_{16}$ hydrocarbon feedstock such as that resulting from the thermal or catalytic cracking operation. This is a liquid when under pressure and hence no diluent is needed.

The polymerization temperature is selected based on the molecular weight desired in the product. As is well known in the art, lower temperatures are used for obtaining higher molecular weight products while higher temperatures are used to obtain lighter products. The polymerization can be carried out in the full range of temperatures generally associated with conventional polybutene polymerization, i.e., about 100° C. to about 50° C.

The resulting polymer typically includes various forms of butene, for example isobutene, 1-butene, trans-2-butene, cis-2-butene, and can contain a small amount of propene and minor amounts of polymerization byproducts. Typically, isobutene constitutes from about 80% to about 95% of the total polyalpha olefin polymer. Hydrogenated polyalpha olefin polymers, such as those described in U.S. Pat. No. 5,177,277 are also useful in the present invention.

Epoxidized polyalpha olefins are described in U.S. Pat. No. 3,382,255 where the polyalpha olefin is dissolved in heptane or other appropriate solvent and reacted with 40% performic, peracetic, perbenzoic, perphthalic acid and others.

Other functionalized polyalpha olefins included as part of this invention include maleic anhydride, maleimide, N-alkyl substituted maleimide, N-aryl or N-substitute aryl maleimides.

Polyalpha olefin, for example, polybutene polymers are commercially available in a variety of grades from Amoco Chemical Company. Included within the present invention are polybutene polymers which are homopolymer, copolymer, unsaturated, hydrogenated and functionalized polymers.

In addition, certain additives can be included in the resin composition of the present invention, such as antistatic agents, fillers, pigments, dyes, antioxidants heat stabilizers, ultraviolet light absorbers, lubricants and other additives commonly employed in polycarbonate compositions.

Suitable stabilizers which may optionally be incorporated into the compositions of the present invention include, but are not limited to hindered phenolic antioxidants, for example Irganox® 1076, Ultranox® 257, phosphites, for example, Ultranox® 626, Irgafox® 168, and thioesters, for example dilaurylthiodipropionate, or a combination thereof.

Suitable antistatic agents which may optionally be incorporated into the compositions of the present invention include, but are not limited to the reaction products of polyethyleneoxide block polymers with epichlorohydrin, polyurethanes, polyamides, polyesters or polyetheresteramides.

Suitable flame retardants are, but not limited to, phosphorus compounds, most commonly phosphonates or phosphates as described in U.S. Pat. No. 4,178,281 which may optionally be incorporated into the resin blend of the present invention. For example these kinds of compounds include, but are not limited to RDP (resorcinol diphosphate), TPP (triphenyl phosphate), PTFE and halogenated materials, etc.

Suitable fillers which may optionally be incorporated into the compositions of the present invention include, but are not limited to talc, glass fiber, carbon fiber, clay silica, mica, conductive metals and minerals, etc.

Suitable mold release agents which may optionally be incorporated into the compositions of the present invention include, but are not limited to PETS (pentaerythritol tetrastearate) and glyceryl monostearate.

DETAILED DESCRIPTION OF THE PREFERRED EMBODIMENTS

The invention is more easily comprehended by reference to specific embodiments which are representative of the invention. It must be understood, however, specific embodiments are provided only for the purposes of illustration and understanding, and that the invention may be practiced otherwise than as specifically illustrated and described without departing from its spirit and scope.

Ingredients used in this example are:

| | |
|---|---|
| PC 100 | Polycarbonate having a weight average molecular weight of about 53,000, as determined by gel permeation chromatography using polystyrene as standards. The intrinsic viscosity is about 0.55 as measured in methylene chloride at 25° C. |
| PC 140 | Polycarbonate having a weight average molecular weight of about 45,000 as determined by gel permeation chromatography using polystyrene as standards. The intrinsic viscosity is about 0.50 as measured in methylene chloride at 25° C. |
| Polybutene L-65: | Polybutene copolymer of isobutylene and butene having a number average molecular weight of 440 | and weight average molecular weight of 550 as determined by gel permeation chromatography using polystyrene as standards.

EXAMPLE I

Compositions containing the ingredients listed in Table I (expressed as parts by weight) were prepared by blending in a Henschel blender the components for about 1 minute, and then the blend was added into the hopper of the extruder. In a typical small scale lab experiment, a twin screw co-rotating intermeshing 10- barrel WP 30 mm extruder was used to compound these blends at 320–400 RPM with a melt temperature of approximately 560–570° F. All test specimens were injection molded in a Toshiba ISE170 injection molding machine using a side-gated test mold with a barrel set temperature at 530° F. and a mold temperature of 150° F. The test specimens were 3.2±0.2 mm thick unless otherwise specified. ASTM test procedures were as follows:

| | |
|---|---|
| D256 | Notched Izod impact |
| D3835 | Capillary Melt Viscosity |
| D638 | Tensile Strength, Modulus and Elongation |
| D790 | Flexural Modulus and Strength |
| D3763* | Multi-Axial Impact (Dynatup) |

*in which ductile failure mode is defined as a puncture of the test plaque without cracks radiating more than 10 mm beyond the center of the impact point.

TABLE I

| | Blend-1 | Blend-2 |
|---|---|---|
| Composition | | |
| PC100 | 100 | 100 |
| Polybutene L-65 | | 2 |
| Melt Viscosity @ 290° C. (poise) | | |
| 100/sec. | 27803 | 19986 |
| 250/sec. | 26024 | 19347 |
| 630/sec. | 18971 | 15107 |
| 1000/sec. | 14541 | 11830 |
| 1500/sec. | 10932 | 9162 |
| 1750/sec. | 9524 | 8091 |
| N. Izod (ft.-lb./in.), RT | 16.7 | 18 |
| Dynatup, RT, 0.125" disc (11'/sec., 50#) | | |
| Total Eng. (ft.-lb.) | 59.93 | 66.86 |
| St. Dev. | 6.16 | 2.36 |
| Max. Eng. (ft.-lb.) | 58.15 | 63.14 |

TABLE I-continued

| | Blend-1 | Blend-2 |
|---|---|---|
| St. Dev. | 4.96 | 0.88 |
| D/SD/B | 5/0/0 | 5/0/0 |
| Dynatup, −30° C., 0.125" disc (11'/sec., 50#) | | |
| Total Eng. (ft.-lb.) | 58.66 | 67.9 |
| St. Dev. | 1.05 | 3.68 |
| Max. Eng. (ft.-lb.) | 57.17 | 65.91 |
| St. Dev. | 0.92 | 5.39 |
| D/SD/B | 5/0/0 | 5/0/0 |
| Flexural Strength (¼", 73° F., 1 in./min.) | | |
| Flex Str. (psi) | 12870 | 14160 |
| Flex Mod. (×10$^5$ psi) | 3.01 | 3.26 |
| Tensile Strength (⅛", 73° F., 2in./min.) | | |
| Strength Yld. (psi) | 8823 | 9288.5 |
| Strength Brk. (psi) | 10340 | 11430 |
| Elong. Yld. (%) | 11.06 | 10.44 |
| Elong. Brk (%) | 191.6 | 243.5 |
| Energy to Brk (lb.-in.) | 2534 | 3455 |
| Light Transmission (%) | 85.7 | 87.4 |

As demonstrated in the above Table I, the addition of 2 wt % polybutene (Amoco Indopol L-65) in PC 100 results in a reduction of melt viscosity approximately 15% over a wide range of shear rate from 100/sec. to 1750/sec. Unexpectedly, the physical properties of this blend, notched Izod impact strength, Dynatup impact strength, Dynatup impact strength at −30° C., tensile yield stress, tensile strength at break, tensile elongation, flexural strength and flex modulus, were found to be either maintained or improved. Specifically, while flow improves by adding polybutene, notched Izod impact strength was maintained at a ductile level of larger than 16 ft-lbs/in. It is also noted that Dynatup impact strength was improved which is a result of the incremental improvement of modulus and toughness. The same performance is believed to be applicable in other polycarbonate resins and polycarbonate copolymers and blends containing one or more polycarbonates. This finding provides a unique route to improve the flow without adversely affecting the impact strength of polycarbonate.

EXAMPLE II

Compositions containing the ingredients listed in Table II (expressed as parts by weight) were prepared by the same method provided in Table I.

TABLE II

|  | Blend-3 | Blend-4 | Blend-5 | Blend-6 | Blend-7 | Blend-8 | Blend-9 |
|---|---|---|---|---|---|---|---|
| PC 140 | 100 | 100 | 100 | 100 | 100 | 100 | 100 |
| PET | 0.15 | 0.15 | 0.15 | 0.15 | 0.15 | 0.15 | 0.15 |
| Irganox 1076 | 0.08 | 0.08 | 0.08 | 0.08 | 0.08 | 0.08 | 0.08 |
| Polybutene L-65 |  | 2 | 4 |  |  |  |  |
| RDP |  |  |  | 2 | 4 |  |  |
| Mineral Oil |  |  |  |  |  | 2 | 4 |
| Melt Viscosity (poise) | | | | | | | |
| 50 sec$^{-1}$ | 10638 | 9125 | 7707 | 7706 | 7313 | 8542 | 6872 |
| 100 sec$^{-1}$ | 10946 | 9322 | 7801 | 7801 | 7321 | 8558 | 6769 |
| 500 sec$^{-1}$ | 7158 | 6364 | 5368 | 5368 | 5248 | 5931 | 4990 |
| 1000 sec$^{-1}$ | 5341 | 4853 | 4112 | 4112 | 4135 | 4625 | 3952 |
| 1500 sec$^{-1}$ | 4296 | 3939 | 3367 | 3367 | 3405 | 3772 | 3273 |
| 2500 sec$^{-1}$ | 2385 | 2251 | 2051 | 2051 | 1959 | 2298 | 1930 |
| N. Izod (ft.-lb/in.), RT | | | | | | | |
| Ave. | 17.2 | 16.9 | 17.3 | 18.3 | 1.5 | 8.8* | 1.4 |
| St. Dev. | 0.5 | 1.4 | 0.7 | 1.1 | 0.1 | 8.3 | 0.1 |
| Dynatup, RT, 0.125" disc (11'/sec., 50#) | | | | | | | |
| Total Eng. (ft.-lb.) | 59.37 | 57.98 | 62.56 | 60.87 | 57.26 | 54.68 | 54.81 |
| St. Dev. | 3.8 | 5.98 | 2.21 | 1.51 | 4.74 | 2.25 | 1.13 |
| Max. Eng. (ft.-lb.) | 56.3 | 54.57 | 59.07 | 56.84 | 52.27 | 51.53 | 52.52 |
| St. Dev. | 4.1 | 5.96 | 1.59 | 1.57 | 3.93 | 2.79 | 1.13 |
| D/SD/B | 5/0/0 | 5/0/0 | 5/0/0 | 5/0/0 | 5/0/0 | 5/0/0 | 5/0/0 |
| Dynatup, −30° C., 0.125" disc (11'/sec., 50#) | | | | | | | |
| Total Eng. (ft.-lb) | 54.1 | 62.14 | 59.6 | 59.34 | 59.23 | 55.39 | 56.03 |
| St. Dev. | 3.43 | 6.39 | 3.32 | 1.09 | 5.61 | 3.1 | 3.81 |
| Max. Eng. (ft.-lb.) | 49.91 | 57.47 | 56.19 | 54.01 | 55.58 | 50.41 | 51.76 |
| St. Dev. | 5.97 | 8.81 | 3.62 | 1.49 | 5.88 | 4.21 | 4.23 |
| D/SD/B | 5/0/0 | 5/0/0 | 5/0/0 | 5/0/0 | 5/0/0 | 5/0/0 | 5/0/0 |
| Flexural Strength (¼", 73° F., 1 in/min.) | | | | | | | |
| Flex Str. (psi) | 13320 | 13970 | 14290 | 14330 | 15330 | 14780 | 15340 |
| Flex Mod. (× 10$^5$ psi) | 3.12 | 3.26 | 3.41 | 3.34 | 3.56 | 3.48 | 3.62 |
| Tensile Strength (⅛", 73° F., 2 in/min.) | | | | | | | |
| Strength Yld. (psi) | 8921 | 9181 | 9271 | 9393 | 9790 | 9484 | 9872 |
| Strength Brk. (psi) | 9447 | 9538 | 9596 | 9596 | 9667 | 9111 | 10030 |
| Elong. Yld (%) | 11.12 | 10.81 | 10.59 | 10.99 | 10.59 | 10.46 | 10.24 |
| Elong. Brk (%) | 163.5 | 168.4 | 173.6 | 164.3 | 158.4 | 146.8 | 176.1 |
| Energy to Brk (lbs.-in.) | 1970 | 2067 | 2117 | 2024 | 1958 | 1794 | 2265 |

*Individual testing data points: 17.7, 2.15, 3.21, 2.83, 18.0 are scattered indicating the test was performed at the temperature of ductile-brittle transition.

As demonstrated in Table II, the polycarbonate containing 2 wt % and 4 wt % polybutene (Amoco Indopol L-65) exhibits a 15% and 28% reduction in melt viscosity (at shear rate of 100 sec$^{-1}$) in comparison with that of the polycarbonate, respectively. While flow improves for polycarbonate with the addition of polybutene, the notched Izod impact strength was maintained at a ductile level of larger than 16 ft-lbs/in. In addition, a 10% increase in Dynatup impact strength was observed which is a result of the incremental improvement of modulus and toughness. When mineral oil or resorcinol diphosphate (RDP) is added in polycarbonate, a similar flow improvement without adversely affecting the notched Izod impact strength was observed at a concentration of 2 wt %. However, when mineral oil or RDP is added at concentration of 4 wt %, the notched Izod impact strength of the polycarbonate composition decreases to a brittle level of 1.5 ft-lbs/in. This finding clearly demonstrates the unique and superior balance of flow and notch Izod impact strength of polybutene in comparison with other additives, such as plasticizers, antiplasticizers or processing aids. Tensile yielding strength is used to gauge the ability of materials undergoing shear deformation and can be used as a ductility index. Material with lower yield strength tends to produce massive plastic deformation during a fracture process and thus results in high impact strength. The loss of impact strength of polycarbonate with RDP and mineral oil can also be seen by increased tensile yield strength. It is evident as indicated in Table II, that the increase of tensile yield strength of the polycarbonate with polybutene added is less than that of the polycarbonate with RDP or mineral oil added. Hence, polybutene provides a superior balance of flow and impact strength.

What is claimed is:

1. A thermoplastic composition comprising:
   (A) from 10 to 99.9 percent by weight of a polycarbonate consisting essentially of recurring structural units of the formula —(O—A—O—C(=O)—)$_n$, wherein A is a divalent aromatic radical selected from the group consisting of a dihydric phenol, a halogen substituted phenol and an alkyl substituted phenol; and (B) from 0.1 to 10 percent by weight of an aliphatic $C_4$ to $C_{16}$ polyalpha olefin.

2. The thermoplastic composition of claim 1 comprising from 0.2 to 2.5 percent by weight of an aliphatic $C_4$ to $C_{16}$ polyalpha olefin.

3. The thermoplastic composition of claim 1, wherein said aliphatic $C_4$ to $C_{16}$ polyalpha olefin is selected from the group consisting essentially of alpha olefin, 1-butene, trans-2-butene, cis-2-butene, isobutylene, 2-methyl-1-propene, 1-pentene, 4-methylpentene-1, 1-hexene, 1-octene and 1-nonene and mixtures thereof.

4. The thermoplastic composition of claim 1, wherein said aliphatic $C_4$ to $C_{16}$ polyalpha olefin has a number average molecular weight of from about 100 to about 5000.

5. The thermoplastic composition of claim 1, wherein said polycarbonate resins have a weight average molecular weight higher than 15,000.

6. The thermoplastic composition of claim 1, further comprises at least one additional component selected from mineral fillers, fibers, stabilizers, colorants, antistatic additives and lubricants.

7. A thermoplastic composition comprising:
(A) from 10 to 99.9 percent by weight of a polycarbonate consisting essentially of recurring structural units of the formula $-(O-A-O-C(=O)-)_n$, wherein A is a divalent aromatic radical selected from the group consisting of a dihydric phenol, a halogen substituted phenol and an alkyl substituted phenol; and
(B) from 0.1 to 10 percent by weight of a functionalized aliphatic $C_4$ to $C_{16}$ polyalpha olefin.

8. The thermoplastic composition of claim 7 comprising from 0.2 to 2.5 percent by weight of an aliphatic $C_4$ to $C_{16}$ polyalpha olefin.

9. The thermoplastic composition of claim 7, wherein said aliphatic $C_4$ to $C_{16}$ polyalpha olefin is epoxy functionalized aliphatic $C_4$ to $C_{16}$ polyalpha olefin selected from a group consisting essentially of 1-butene, trans-2-butene, cis-2-butene, isobutylene, 2-methyl-1-propene, 1-pentene, 4-methylpentene-1, 1-hexene, 1-octene and 1-nonene and mixtures thereof.

10. The thermoplastic composition of claim 7, wherein said functionalized aliphatic $C_4$–$C_{16}$ polyalpha olefin has a number average molecular weight of from about 100 to about 5000.

11. The thermoplastic composition of claim 9, wherein said polycarbonate resins have a weight average molecular weight higher than 15,000.

12. The thermoplastic composition of claim 9, wherein said aliphatic $C_4$ and $C_{16}$ polyalpha olefin is epoxy-functionalized.

* * * * *